United States Patent Office 3,575,936
Patented Apr. 20, 1971

3,575,936
CHEMICAL AND HEAT CONVERSION OF POLY-AMIDE-ACIDS TO POLYIMIDES
Frank J. Dinan, Eggertsville, N.Y., assignor to E. I. du Pont de Nemours and Company, Wilmington, Del.
No Drawing. Continuation of application Ser. No. 537,005, Mar. 24, 1966. This application Feb. 10, 1969, Ser. No. 800,355
Int. Cl. C08g 20/32
U.S. Cl. 260—78
17 Claims

ABSTRACT OF THE DISCLOSURE

The chemical and heat conversion of a polyamide-acid to the corresponding polyimide, using as the chemical converting agent an N-acyl azole compound, having a 5-membered heterocyclic ring containing 2 through 4 nitrogen atoms and two double bonds.

---

This application is a continuation of Ser. No. 537,005, filed Mar. 24, 1966, now abandoned. This invention relates to chemical and heat conversion of polyamide-acids to the corresponding polyimides.

The chemical and heat conversion of polyamide-acids to the corresponding polyimides is known. Previously suggested chemical treating agents for this purpose have been lower fatty monobasic acid anhydrides such as acetic anhydride and aromatic monobasic acid anhydrides such as benzoic anhydride.

According to the present invention, improved results in such conversion are obtained by using one or more of a particular class of N-acyl azole compounds as the chemical converting agent. The use of these compounds promotes intimate admixture of the converting agent and the polyamide-acid solution and significantly reduces the formation of local hot spots which often produce lumps and cause non-uniform conversion.

According to the present invention, a polyamide-acid, in solution in a suitable inert organic solvent, is admixed with at least one N-acyl diazole, triazole or tetrazole compound, at a temperature below about 50° C. to prevent any substantial conversion of the polyamide-acid to the polyimide; the resulting mass is formed into a shaped article; and the temperature of the article is thereafter raised to a temperature above about 75° C. to convert the polyamide-acid in the article to polyimide.

The polyamide-acids convertible to polyimides are well known and are disclosed for example in the following references:

| Patentee | U.S. Pat. No. | Issued |
|---|---|---|
| Koerner et al | 3,022,200 | Feb. 20, 1962 |
| Lavin et al | 3,105,775 | Oct. 1, 1963 |
| Smith et al | 3,168,417 | Feb. 2, 1965 |
| Edwards | 3,179,614 | Apr. 20, 1965 |
| Endrey | 3,179,630 | Apr. 20, 1965 |
| Endrey | 3,179,631 | Apr. 20, 1965 |
| Hendrix | 3,179,632 | Apr. 20, 1965 |
| Endrey | 3,179,633 | Apr. 20, 1965 |
| Edwards | 3,179,634 | Apr. 20, 1965 |
| Frost et al | 3,179,635 | Apr. 20, 1965 |

Also French Pat. No. 1,386,617. Also copending U.S. patent applications Ser. No. 468,140 filed June 29, 1965, by Lindsey and Locey; Ser. No. 472,314 filed July 15, 1965, by Sorenson; Ser. No. 532,898 filed Mar. 9, 1966, by Tocker; and Ser. No. 532,886, 1966, by Rogers; each of these applications being assigned to the same assignee as that of the present invention. The entire disclosures of all of the above references are hereby incorporated by reference.

As can be seen from the references, useful polyamide-acids include those of the AB type formed by self-condensation of an amino aromatic dicarboxylic acid anhydride or acid salt thereof, as well as those of the AA–BB type formed by reaction of an aromatic tricarboxylic acid anhydride or acid halide thereof, or a tetracarboxylic acid dianhydride, with an organic diamine. Either or both of the tetracarboxylic acid dianhydride and the organic diamine can be aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof.

The N-acyl azole compound is a heterocyclic compound having at least one 5-membered ring containing at least two, i.e. 2, 3 or 4, nitrogen atoms in the ring and having two double bonds in the ring. These include compounds of the following classes: imidazole, benzimidazole, pyrazole, benzopyrazole, the triazoles (1,2,3-triazole and 1,2,4-triazole), benzotriazole and tetrazole. Imidazole is preferred because of availability.

The N-acyl derivatives of the foregoing classes of heterocyclic compounds are generally known. They can conveniently be prepared by acylation of the corresponding heterocyclic compounds, replacing the hydrogen on the ring nitrogen by an acyl group (1) 

the term acyl being used in its ordinary broad meaning to include an organic radical derived from an organic acid by removal of the hydroxyl group. The acylation can be carried out using the free acid or an acid chloride or bromide. Suitable preparative methods are described, for example, in Angew. Chem. Internat. Edit. 1, 352 (1962), and Ann. 580, 159 (1953).

The useful N-acyl azole compound will therefore have the formula (2) 

where
A is the heterocycic ring as described above and X is oxygen or sulfur.
Y in the above formulas can be any of a large number of substituents. For example, Y can be hydrogen as will be the case when the acyl group is formyl (when X is oxygen). Y can also be an aliphatic radical of 1 through 18 carbons or an aromatic radical of 6 through 18 carbons. Mixed aliphatic and aromatic radicals are included.

The aliphatic, aromatic or mixed radicals can be unsubstituted or if desired substituted with from 1 through 3 substituents, which can be the same or different, including such substituents as chlorine, bromine, fluorine, nitro, alkyl of 1 through 8 and preferably 1 through 4 carbons, phenyl, alkoxy of 1 through 8 and preferably 1 through 4 carbons, dialkylamino where each alkyl portion has 1 through 8 and preferably 1 through 4 carbons, and alkanecarboxamido where the alkane portion has 1 through 8 and preferably 1 through 4 carbons.

It will be seen therefore that the acyl group can be derived from aliphatic saturated acids such as acetic acid, propionic acid, stearic acid, or the like; from aliphatic unsaturated acids such as oleic acid, crotonic acid, propiolic acid, or the like; from aromatic acids such as benzoic acid, naphthoic acid, or the like; or from mixed aromatic-aliphatic acids such as cinnamic acid, or the like.

Alternatively, the N-acyl azole compound can contain more than one heterocyclic ring of the classes mentioned above. Such compounds can have the structure (3) 

where A and X have the same meaning as above. A representative compound of this type is carbonyl diimidazole, derived from carbonic acid and which can be prepared by reaction of imidazole and phosgene. Another class of bicyclic azoles has the structure (4) 

such as derived from oxalic acid, where A and X have the same meaning as above.

Still another class of useful N-acyl azoles are those derived from multifunctional acids such as succinic acid, adipic acid, terephthalic acid, isophthalic acid, diphenic acid, and the like. Such compounds have the formula (5) 

where A and X have the same meaning as above, and Z is a divalent radical corresponding to the definition of Y given above with respect to Formulas 1 and 2, (excluding hydrogen, of course), but rendered divalent by removal of a hydrogen atom, i.e. Z can be aliphatic, aromatic or a mixture of these, up through a total of 18 carbons, and Z can of course be unsubstituted or substituted as described above with respect to Y.

It can be seen from the above that thiocarbonamides are specifically included within the scope of useful azoles according to this invention. Illustrative of such azoles can be mentioned N-thioacetylimidazole, N-thiobenzoylpyrazole, N-thiopropionylbenzimidazole, N-(3-chlorophenylthiocarbonyl)-1,2,4-triazole, etc.

Further illustrative of the acyl radicals of Formula 1 above and representative of those useful in Formula 2 according to the present invention can be named the following: formyl, acetyl, propionyl, n-butyryl, isobutyryl, ni-valeryl, trimethylacetyl, caproyl, caprylyl, capryl, myristoyl, stearoyl, acrylyl, crotonyl, oleoyl, methylpropiolyl, phenylacetyl, cinnamoyl, trifluoroacetyl, trichloroacetyl, benzoyl, 2-chlorobenzoyl, 2-bromobenzoyl, 3-chlorobenzoyl, 3-bromobenzoyl, 3-methoxybenzoyl, 3-nitrobenzoyl, 4-toluyl, 4-ethylbenzoyl, 4-isopropylbenzoyl, 4-phenylbenzoyl, 4-methoxybenzoyl, 4-chlorobenzoyl, 4-bromobenzoyl, 4-diethylaminobenzoyl, 4-propionylaminobenzoyl, 2,6-dimethoxybenzoyl, alpha-naphthoyl, 3,4,5-trimethoxybenzoyl, 3,5,7-trichloro-1-naphthoyl, 4-dimethylamino-3,5-dichlorobenzoyl, thioacetyl, thiopropionyl, thiobenzoyl (or phenylthiocarbonyl), 3-chlorophenylthiocarbonyl, 1-imidazolylacetyl and beta(1-pyrazolyl)propionyl.

In addition to those radicals in the foregoing list, which (except for formyl) can be present as the

portion in the compounds of Formula 5 above by removal of a hydrogen from the Y group, the following radicals are representative of those appearing between the two heterocyclic rings (A) in the compounds of formulas (3), (4) and (5) above: succinyl, glutaryl, adipyl, sebacyl, brassyl, cyclohexane-1,4-dicarbonyl, terephthaloyl, isophthaloyl, 4,4'-biphenylenedicarbonyl, 1,5-naphthylenedicarbonyl, 2,5-dimethoxyterephthaloyl, 4-chlorophthaloyl, 4-bromophthaloyl, oxalyl, carbonyl, dithioadipyl, dithioterephthaloyl.

The N-acyl azole compounds without departing from the scope of useful compounds contemplated herein, can if desired have a variety of substituents attached to carbon in heterocyclic ring, or in both rings if applicable. Up through a maximum of 3 such substituents per ring can be present. The substituents can be the same or different and can be such substituents as chlorine, bromine, fluorine, nitro, alkyl of 1 through 8 and preferably 1 through 4 carbons, phenyl, alkoxy of 1 through 8 and preferably 1 through 4 carbons, dialkylamino where each alkyl portion has 1 through 8 and preferably 1 through 4 carbons, and alkanecarboxamido where the alkane portion has 1 through 8 and preferably 1 through 4 carbons.

Illustrative of substituted azoles which can have the acyl group attached to form the useful N-acyl azoles according to this invention can be mentioned the following:

4-chloroimidazole
4-bromo-1,2,3-triazole
5-fluoro-benzimidazole
3-nitro-1,2,4-triazole
3-methylpyrazole
4-propylpyrazole
5-phenyltetrazole
4-ethoxybenzotriazole
4,6-dimethoxybenzotriazole
5-dimethylaminobenzopyrazole
3-hexyl-5-chlorobenzopyrazole
3-bromo-5,7-dimethylbenzopyrazole
5-acetamidobenzimidazole
3-nitro-5,7-dichlorobenzopyrazole A generic definition of N-acyl azoles within the scope of this invention is given by the formula (6) 

where

A is (with reference to other than the indicated

group) either unsubstituted or substituted as described above and is a heterocyclic radical derived from imidazole benzimidazole, pyrazole, benzopyrazole, 1,2,3-triazole, 1,2,4-triazole, benzotriazole, or tetrazole by removal of a hydrogen from a nitrogen in the ring;

X is oxygen or sulfur; and
Y is halogen;

aliphatic of 1 through 18 carbons which can be unsubstituted or substituted as described above;
aromatic of 6 through 18 carbons which can be unsubstituted or substituted as described above;
—A, where A is as defined in Formula 6;

where X and A are as defined in Formula 6;
—Z—A, where A is a defined in Formula 6 and Z is a divalent aliphatic, aromatic or mixed aliphatic-aromatic radical of 1 through 18 carbons which can be unsubstituted or substituted as described above; or

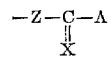

where Z, X and A are as just defined.

The conditions of the conversion process in such details as temperature, solvents, concentrations, shaping of articles, etc., are all routine.

In the process of the present invention, the polyamide-acid in solution and the N-acyl azole compound are mixed under conditions that prevent any substantial conversion of the polyamide-acid to polyimide. Although the stoichiometric equivalent, based on the polyamide-acid, of the azole compound is operable in the present invention, it is preferred to use 1.5–3.0 times the stoichiometric amount of the azole compound. The azole compound readily dissolves in the polyamide-acid solution and the resulting solution can be held for several hours at temperatures as high as about 50° C., or 24 hours at 25° C., without gelation.

During this step in which the azole compound and the polyamide-acid solution are admixed, the temperature will be maintained below that which could cause conversion of the polyamide-acid to polyimide. The particular temperature maintained during this step will generally be below about 50° C. and will depend upon the solvent used, the reactivity of the particular azole compound used and the concentration of the materials in the solution. Ordinarily, the polyamide-acid solution containing the azole compound is maintained at a temperature of about −5° C. to 15° C. and in some cases up to room temperature. At such temperatures the system remains essentially inactive, meaning that no more than about 10% by weight of the polyamide-acid is converted to polyimide in about 10 minutes at this temperature. It should be understood that more conversion can be tolerated. The particular amount will depend upon the particular polymer being used, the nature and amount of solvent and the method contemplated for shaping the polymeric composition into a useful article.

Shaping can be performed in a wide variety of procedures. The polyamide-acid solution can be extruded, spun, sprayed, blade-coated or molded. Films of the solution can be conveniently formed by extruding the solution through an orifice onto a belt, drum or similar smooth surface. Fibers can be made by "dry" spinning. Foams can be made by techniques disclosed in Hendrix United States patent application U.S. Pat. 3,249,561 and Amborski and Weisenberger U.S. Pat. 3,310,506, both filed Mar. 18, 1963. The polyamide-acid solution may also be sprayed onto a surface to provide a coating. Spraying is particularly useful for coating irregularly shaped articles and rough surfaces and for impregnating porous materials. Fillers or other additives (pigments, abrasives, etc.) can be added at any time prior to shaping.

After the polyamide-acid/azole compound solution has been converted into a film, fiber, powder or the like, or has been used to coat or impregnate a substrate, the article can be stored in the unconverted condition, or heated to at least 75–100° C. to effect cyclization to the imide. A carboxylic acid corresponding to the acyl portion of the azole converting agent is formed as a by-product of the imidization. This is removed with the solvent in the normal fashion.

The process of this invention has several important advantages. No additional reagents are required. A solution of a polyamide-acid containing one of the azole converting agents has gel times at room temperature of greater than 24 hours, as mentioned above. At 70° C., gelation occurs in about 15–20 minutes, and at 100° C. in about 2–3 minutes. Gelation time continues to drop as the temperature rises, being about 0.5 minute at 120° C. These gelation times mean that a solution can be prepared ahead of time and stored for prolonged times without fear of premature gelation. In addition, the azole converting agents are effective without concurrent formulation of an intolerable number of undesirable local hot spots.

The invention will be more clearly understood by referring to the examples which follow. These examples, which ilustrate specific embodiments of the present invention, should not be construed to limit the invention in any way.

EXAMPLE 1

To 20 grams of a 15% solids solution in N,N-dimethylacetamide of bis(4-aminophenyl) ether polypyromellitamide-acid was added 1.74 grams of N-acetyl imidazole (2 equivalents per polymer unit). This had been prepared from imidazole and acetyl chloride by the procedure of Wieland and Schneider, Ann. 580, 159 (1953). The N-acetyl imidazole was mixed in at room temperature. After centrifuging to remove air bubbles, the solution was cast into a 12 mil film on a glass plate. The film was dried 20 minutes in a 120° C. oven, then stripped from the plate, clamped into a rigid frame and heated in a 300° C. oven for 30 minutes. The product was a flexible, moderately strong film, which in appearance resembled very closely polyimide films of the same chemical composition which had been cyclized by acetic anhydride plus pyridine.

EXAMPLE 2

Four experiments were run at different temperatures to determine the activation energy for the conversion (observed as gelation) by N-acetyl imidazole of a bis-(4-aminophenyl)-ether polypyromellitamide-acid solution in N,N-dimethylacetamide. In each case, the polymer (5 grams of a 15% by weight solution in N,N-dimethylacetamide) was placed in a centrifuge tube which was agitated by hand for 10 minutes in a water bath at the desired temperature. Then a 4-fold molar excess of N-acetyl imidazole (0.86 gram) was added to each portion of polymer solution, and the time from that point till gelation was measured. Gelation was judged to have occurred when a filament of polymer could no longer be drawn from the solution. The following results were obtained:

| Temperature | | Gelation time (seconds) |
|---|---|---|
| ° C. | Absolute | |
| 23 | 296 | ca. 92,000 |
| 50 | 323 | 5,320 |
| 70 | 343 | 990 |
| 100 | 373 | 156 |

A plot of the reciprocal of the absolute temperature versus the logarithm of the time in seconds gives an activation energy for gelation of 17.5 Kcal. per mole.

EXAMPLES 3–14

When an equivalent amount of each of the following azole compounds is substituted for N-acetyl imidazole in the procedure of Example 1, comparable results are obtained:

Ex. No.: Azole compound
3 _____ N-formyl imidazole.
4 _____ N-propionyl benzimidazole.
5 _____ N-acetyl pyrazole.
6 _____ N-acetyl-1,2,3-triazole.
7 _____ N-acetyl-1,2,4-triazole.
8 _____ N-acetyl benzotriazole.
9 _____ N-acetyl tetrazole.
10 _____ N-stearoyl imidazole.
11 _____ N-trifluoroacetyl imidazole.
12 _____ N-benzoyl imidazole.
13 _____ N-(2-chlorobenzoyl) imidazole.
14 _____ N- 4-ethoxybenzoyl) imidazole.

I claim:
1. The process for converting polyamide-acid which comprises
admixing polyamide-acid characterized by the formula

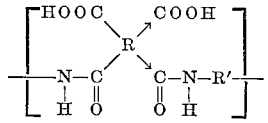

wherein → denotes isomerism; R is a tetravalent organic radical containing at least 2 carbon atoms, no more than 2 carbonyl groups of each polyamide-acid unit being attached to any one carbon atom of said tetravalent radical; R' is a divalent radical containing at least 2 carbon atoms, the amide groups of adjacent polymide-acid units each attached to separate carbon atoms of said divalent radical; with an N-acyl azole compound having a 5-membered heterocyclic ring containing 2 through 4 nitrogen atoms and two double bonds in the ring at a temperature below about 50° C.;
shaping the resulting mass into a shaped article; and thereafter raising the temperature of said shaped article above about 70° C. to convert the polyamide-acid therein to polyimide.

2. The process of claim 1 wherein the amount of said N-acyl azole compound utilized is between about 1.0 and about 3.0 times the stoichiometric amount, based upon said polyamide-acid.

3. The process of claim 1 wherein said N-acyl azole compound has the formula

where
A is a heterocyclic radical resulting from removal of a hydrogen from a nitrogen in the ring of a heterocyclic compound selected from the group consisting of imidazole, benzimidazole, pyrazole, benzopyrazole, 1,2,3-triazole, 1,2,4-triazole, benzotriazole and tetrazole;
X is selected from the group consisting of oxygen and sulfur; and
Y is selected from the group consisting of A where A has the same meaning as above;
hydrogen;
aliphatic radicals of 1 through 18 carbons;
aromatc radicals of 6 through 18 carbons;

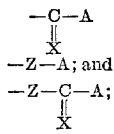

where A and X have the same meaning as above; and Z is a divalent radical selected from the group consisting of aliphatic, aromatic and mixed aliphatic-aromatic radicals of 1 through 18 carbon atoms.

4. The process of claim 3 wherein said shaped article is a self-supporting film.

5. The process of claim 3 wherein said N-acyl azole compound is N-acetyl imidazole.

6. The process of claim 3 wherein said N-acyl azole compound is N-formyl imidazole.

7. The process of claim 3 wherein said N-acyl azole compound is N-propionyl benzimidazole.

8. The process of claim 3 wherein said N-acyl azole compound is N-acetyl benzotriazole.

9. The process of claim 3 wherein said N-acyl azole compound is N-acetyl tetrazole.

10. The process of claim 3 wherein said N-acyl azole compound is N-stearoyl imidazole.

11. The process of claim 3 wherein said N-acyl azole compound is N-trifluoroacetyl imidazole.

12. The process of claim 3 wherein said N-acyl azole compound is N-benzoyl imidazole.

13. The process of claim 3 wherein said N-acyl azole compound is N-(2-chlorobenzoyl) imidazole.

14. The process of claim 3 wherein said N-acyl azole compound is N-(4-ethoxybenzoyl) imidazole.

15. The process of claim 3 wherein said N-acyl azole compound is N-acetyl pyrazole.

16. The process of claim 3 wherein said N-acyl azole compound is N-acetyl-1,2,3-triazole.

17. The process of claim 3 wherein said N-acyl azole compound is N-acetyl-1,2,4-triazole.

References Cited
UNITED STATES PATENTS

| | | | |
|---|---|---|---|
| 3,179,633 | 4/1965 | Endrey | 260—78 |
| 3,179,634 | 4/1965 | Edwards | 260—78 |
| 3,347,828 | 10/1967 | Stephens et al. | 260—78 |
| 3,355,427 | 11/1967 | Loncrini | 260—78 |

HAROLD D. ANDERSON, Primary Examiner

U.S. Cl. X.R.

117—161; 260—2.5, 47, 65